United States Patent [19]
Pollok

[11] 4,455,098
[45] Jun. 19, 1984

[54] SELF-PUMPING THRUST BEARING FOR ELECTRIC MACHINES

[75] Inventor: Hans-Jurgen Pollok, Berlin, Fed. Rep. of Germany

[73] Assignee: Siemens Aktiengesellschaft, Munich, Fed. Rep. of Germany

[21] Appl. No.: 429,864

[22] Filed: Sep. 30, 1982

[30] Foreign Application Priority Data

Oct. 13, 1981 [DE] Fed. Rep. of Germany ....... 3141059

[51] Int. Cl.³ .................... F16C 17/04; F16C 33/10; F16N 7/28
[52] U.S. Cl. ................................. 384/307; 384/368; 384/399; 384/415
[58] Field of Search ............... 384/316, 130, 122, 121, 384/144, 194, 224, 240, 248, 251, 303, 306, 307, 308, 309, 311, 313, 368, 364, 397, 398, 399, 415, 132, 224, 420, 424, 425, 426; 184/5, 6.18, 6.23

[56] References Cited
U.S. PATENT DOCUMENTS
3,922,042 11/1975 Sato et al. ......................... 384/307

FOREIGN PATENT DOCUMENTS
187759 11/1956 Austria .............................. 384/303
205298 9/1959 Austria .............................. 384/303
L 014419 12/1955 Fed. Rep. of Germany ...... 384/415
55-2867 1/1980 Japan ................................. 384/415
571745 9/1945 United Kingdom .

Primary Examiner—Stuart S. Levy
Assistant Examiner—Thomas R. Hannon
Attorney, Agent, or Firm—Kenyon & Kenyon

[57] ABSTRACT

A self-pumping thrust bearing for electric machines having a vertical shaft is disclosed in which oil circulates through radially-extending bores in a rotating thrust ring to suck hot oil from an oil space and transfer it to a ring canal disposed in a stationary part. In order to make the transition from the rotating thrust ring to the stationary ring canal as loss free as possible, there is arranged on the outside at the thrust ring a circular canal into which the bores lead. This circular canal is bounded on the side facing the stationary part by a height-adjustable ring which is held at the thrust ring with a gap between the ring and the thrust ring. The transfer of oil therefore takes place around the entire circumference of the thrust ring so that turbulence is avoided. The quantity of oil pumped can be adjusted by adjusting the width of the gap.

4 Claims, 2 Drawing Figures

SELF-PUMPING THRUST BEARING FOR ELECTRIC MACHINES

BACKGROUND OF THE INVENTION

The present invention relates to a self-pumping thrust bearing for electric machines having a vertical shaft, particularly hydro-electric generators.

A self-pumping thrust bearing is disclosed in British Pat. No. 571,745 in which oil circulation to a cooler is continuously maintained through bores in the thrust ring in order to prevent excessive heating of oil flowing through the bearing gap. The bore diameters and their number determine the quantity of oil pumped to the cooler. The oil emerging from the individual pump bores enters in individual jets into a ring canal in a stationary part, which, however, causes turbulence layers and thereby pressure losses. From the ring canal, the oil is then fed to the cooler via pipelines.

OBJECTS AND SUMMARY OF THE INVENTION

Objects of the present invention are to provide a self-pumping thrust bearing of the above-described type in which the quantity of oil pumped is adjustable, and the transition from the rotating pump bores into the stationary ring canal takes place with losses as low as possible. Another object is to provide such a thrust bearing in a simple manner.

The above and other objects are achieved by the invention disclosed herein.

In a thrust bearing according to the invention, oil circulates through approximately radially-extending bores provided in a revolving thrust ring which draw the oil from a suction space disposed radially inwardly above the bearing gap and transfer the oil into a ring canal arranged in a stationary part adjacent to the thrust ring. From the ring canal, the oil is fed to a cooler or coolers and thereupon to an oil space in the thrust bearing cup. Sealing means are provided in the gap between the outer surface of the thrust ring and the stationary part in which the ring canal is disposed. A circular canal is provided adjacent to the outer surface of the thrust ring into which the radial bores lead. The circular canal is bounded with a gap on the side facing the stationary part by a ring which is held at the thrust ring and can be adjusted relative to the thrust ring, i.e. in height. Due to the disposition of the circular canal at the radially outer edge of the thrust ring, oil is distributed in the thrust bearing in a film covering the entire outer surface of the thrust ring. Thus, oil is also delivered into the ring canal of the stationary part around its entire circumference. This avoids eddies and turbulence and the transition is loss-free. Through a suitable choice of the gap which can be adjusted continuously in a simple manner by the adjustable ring, the quantity of oil pumped can be regulated as desired.

Advantageously, in accordance with an aspect of the invention the opposite end faces of the thrust ring and the adjustable ring, and the boundary walls of the ring canal in the stationary part diverge gradually in a conical manner. Thereby, the opening of the ring canal at the thrust ring as well as the opening opposite the thrust ring in the stationary part is shaped as a nozzle, so that a laminar flow is obtained for the oil passing from the rotating part, namely the thrust ring, to the stationary part. Thereby, losses which can otherwise occur in the transition are reduced still further.

Advantageously, in accordance with another aspect of the invention, fastening of the adjustable ring at the thrust ring is accomplished by screws extending parallel to the shaft. The gap width can then be adjusted without the need to disassemble the stationary part with the ring canal which is situated in front of the gap opening.

The above and other objects, features, aspects and advantages of the invention will be more apparent from the following description of the preferred embodiments thereof when considered with the accompanying drawings and appended claims.

BRIEF DESCRIPTION OF THE DRAWINGS

The present invention is illustrated by way of example and not limitation in the figures of the accompanying drawings in which like numerals indicate similar parts and in which.

DESCRIPTION OF THE PREFERRED EMBODIMENTS

Figure 1:
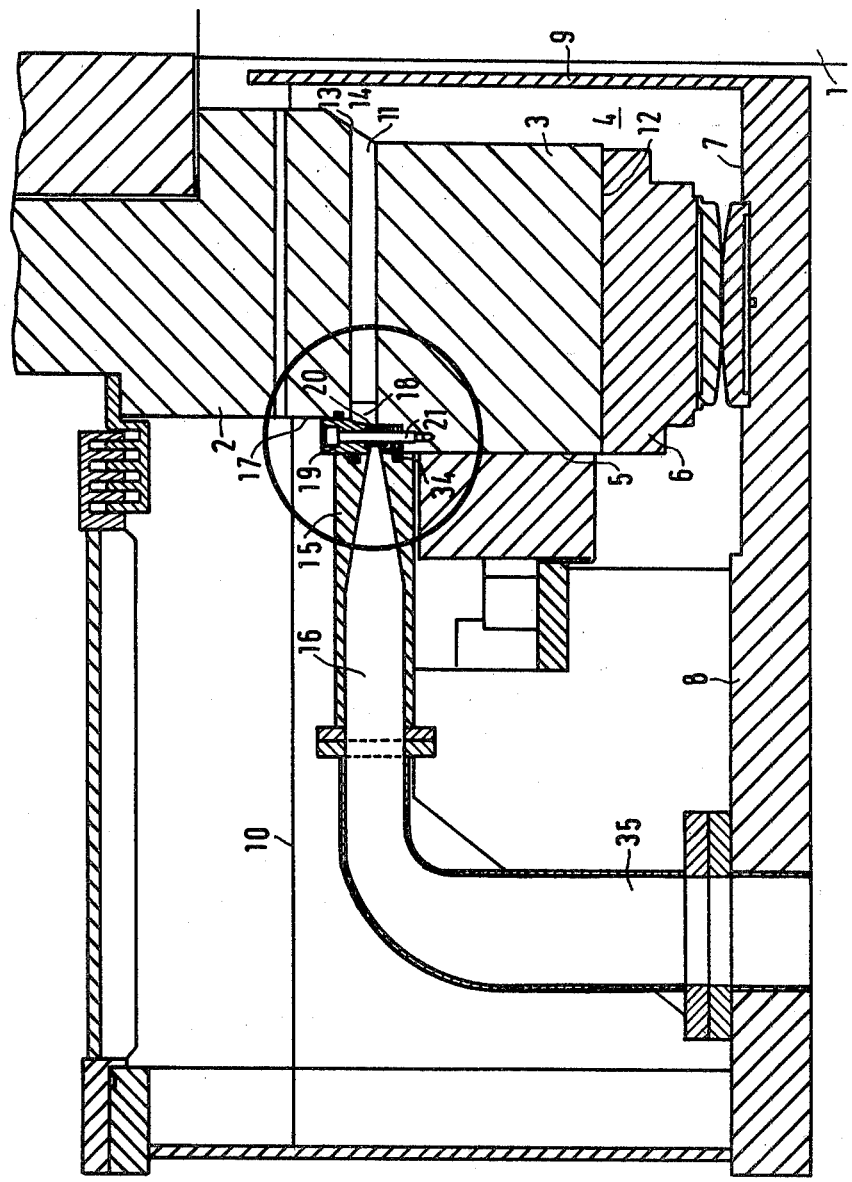
FIG. 1 is a radial section view of a self-pumping thrust bearing in accordance with the invention.
Figure 2:
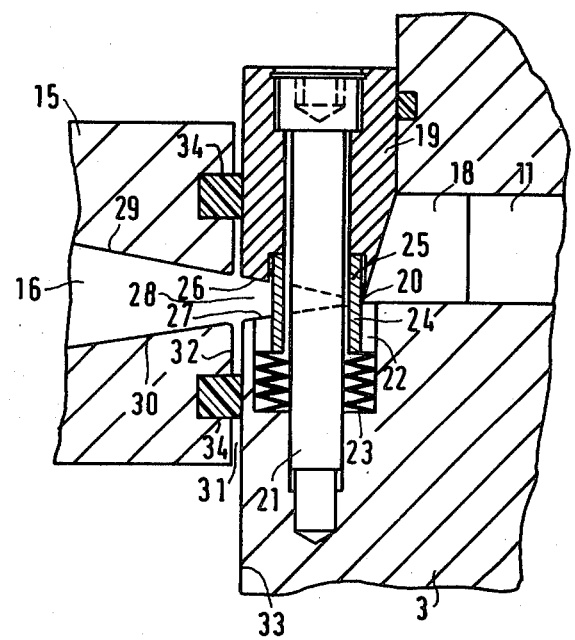
FIG. 2 is an enlarged detail view of the portion of the thrust bearing of FIG. 1 within the circle in FIG. 1.

Referring now to the drawings, the vertical shaft 1 of a hydro-electric generator is supported via a support head 2 having a thrust ring 3 by a self-pumping thrust bearing comprising a support bearing 4 and a guide bearing 5. The support bearing 4 comprises individual thrust segments 6 which are adjustably supported on the bottom 7 of the thrust bearing cup 8 in a known manner.

The thrust bearing cup 8 is closed off by a wall 9 from the vertical shaft 1 and is filled to the oil level 10 with oil for cooling and lubricating the bearing.

To make continuous oil circulation possible, the revolving thrust ring 3 is provided with radial bores or holes 11 which cause a pumping effect, similar to that of a centrifugal pump, when the thrust ring 3 rotates and draw the oil, which is heated after passing through the bearing gap 12, from an oil suction space 14 disposed in front of the openings 13 of the bores 11 and pump it to the ring canal 16 arranged in the stationary part 15.

So that the transition of the oil on the rotating thrust ring 3 to the stationary part 15 takes place with as low losses as possible, the bores 11 lead to a circular canal 18 arranged in a radially outer ring 17 of the thrust ring 3. There, oil which has already been pumped through the bores 11 in the rotating thrust ring 3 is distributed over the entire circumference of the cylindrial thrust ring. The circular canal 18 is closed off by a height-adjustable ring 19 except for a gap 20. The ring 19 is fastened to the thrust ring 3 by screws 21 extending in blind holes parallel to the vertical shaft. A compression spring 23 and a sleeve 24 are arranged in the blind hole and surround the screw 21 in such a manner that the sleeve 24 is engaged in a corresponding recess 25 at the lower end face 26 of the ring 19. By screwing the screws 21 into or out of the thrust ring 3, the width of the gap 20 can be adjusted and thereby the flow of the oil from the circular canal 18 can be adjusted.

The mutually opposite end faces 27 of the thrust ring 3 and the lower end face 26 of the height-adjustable ring 19 diverge conically to define a nozzle-shaped opening 28. Also, the boundary walls 29 and 30 of the ring canal 16 which are opposite the opening 28 in the stationary part 15 initially conically continuously diverge at an inclination corresponding to that of end faces 26 and 27 until they reach a zone in the ring canal 16 having parallel boundary walls. In addition, the gap 31 between the inner cylindrical wall 32 of the stationary part 15 and the outer cylindrical wall 33 of the thrust ring 3 is sealed by two sealing rings 34 in order to prevent leaked oil from emerging through the gap 31.

The oil pumped by the bores 11, which is distributed in the circular canal 18 over the entire circumference of the revolving thrust ring 3, passes via the nozzle-shaped opening 28 in a largely laminar flow into the ring canal 16 in the stationary part 15. This transition is therefore largely loss free. From the ring canal 16, the oil is then conducted via a line 35 to a cooler or coolers, not shown, and then is fed, cooled, to the thrust segments 6, via paths, not shown.

The advantages of the present invention, as well as certain changes and modifications of the disclosed embodiments thereof, will be readily apparent to those skilled in the art. It is the applicant's intention to cover by his claims all those changes and modifications which could be made to the embodiments of the invention herein chosen for the purpose of the disclosure without departing from the spirit and scope of the invention.

What is claimed is:

1. A self-pumping thrust bearing for electric machines having a vertical shaft comprising a rotating thrust ring, a thrust ring cup in which the thrust ring is disposed, an oil space between the thrust ring and the vertical shaft disposed above the bearing gap, approximately radially-extending bores in the rotating thrust ring, a ring canal arranged in a stationary part disposed adjacent to the thrust ring, the radial bores being operative upon rotation of the thrust ring to suck oil from the oil space and feed it to the ring canal from which it is fed to at least one cooler and returned to the thrust bearing cup, sealing means disposed in the gap between the outer surface of the thrust ring and the stationary part, a circular canal disposed adjacent to the outer surface of the thrust ring into which the radial bores open, a ring disposed adjacent the thrust ring bounding the circular canal on its side facing the stationary part with a gap therebetween, and means for adjusting the position of the ring relative to the thrust ring.

2. The self-pumping thrust bearing according to claim 1 wherein mutually opposite end faces of the thrust ring and the adjustable ring, and boundary walls of the ring canal in the stationary part which are opposite the circular opening continuously diverge conically from the thrust ring and the adjustable ring.

3. The self-pumping thrust bearing according to claim 1 wherein the adjustable ring is fastened to the thrust ring by screws extending into a blind threaded hole in the thrust ring parallel to the shaft.

4. The self-pumping thrust bearing according to claim 3 wherein a compression spring is disposed in each blind hole and a sleeve is disposed in the blind hole interposed between the circular canal and the spring resting on the spring, the screw extending through the sleeve and spring.

* * * * *